United States Patent [19]

Carlson

[11] 4,232,753
[45] Nov. 11, 1980

[54] ENDLESS TRACK VEHICLE

[75] Inventor: Kaj Carlson, Singsby, Finland

[73] Assignee: Konetehdas Maskinfabrik NORCAR Ky Kb, Finland

[21] Appl. No.: 954,606

[22] Filed: Oct. 25, 1978

[30] Foreign Application Priority Data

Oct. 28, 1977 [FI] Finland ................................ 773232

[51] Int. Cl.² .......................................... B62D 55/20
[52] U.S. Cl. .................................. 180/9.2 R; 305/39
[58] Field of Search .................. 180/9.2 R, 9.2 C; 305/40, 39, 35, 47

[56] References Cited

U.S. PATENT DOCUMENTS 1,429,589   9/1922   Helm ...................................... 305/39

FOREIGN PATENT DOCUMENTS 898861   4/1972   Canada ................................. 180/9.2 C
2143329   3/1973   Fed. Rep. of Germany ....... 180/9.2 R

*Primary Examiner*—John A. Pekar
*Attorney, Agent, or Firm*—McGlew and Tuttle

[57] ABSTRACT

An endless track vehicle, especially a light cross-country vehicle is provided, in which a special supporting wheel bogie suspension facilitates the movements of the vehicle in terrain. By means of the bogie wheel suspension also a permanent tight running of the tracks around the driving and running wheels is achieved without any risk of the tracks falling off the wheels. A special track construction for light vehicles is also provided by means of which the track—when turned around a wheel—is made rigid in directions perpendicular to the turning plane. By this construction a track is obtained wherein the risk of the track falling off the wheels of the terrain vehicle is reduced to a minimum.

7 Claims, 4 Drawing Figures

ENDLESS TRACK VEHICLE

BACKGROUND OF THE INVENTION

1. Field of the Invention

This invention relates to a light endless track vehicle, especially to its steering and supporting wheel arrangement as well as the endless track bands or tracks for use in this arrangement.

In endless track vehicles the power for operating and steering the vehicle is transmitted via driving wheels to the tracks. The tracks can consist in light vehicles for example of two endless edgechains interconnected by means of transverse blocks. The tracks surround two or more wheels on either side of the vehicle. The driving wheels usually support also the rear end of the vehicle. In the front end of the vehicle is provided corresponding freely rotating wheels, so called running wheels, over which the tracks run in the front part of the vehicle. Especially in cross-country vehicles these running wheels have a smaller diameter than the driving wheels. Between the rear driving wheels and the front running wheels are provided supporting wheels. Often several in a row, which have a smaller diameter than both the driving and the running wheels. The running wheels are so arranged that the lower part of the tracks forms, between the running wheels and the front supporting wheels, a upwardly slanting part, which facilitates the movements of the vehicle in terrain and e.g. in snow. The supporting wheels can also be of the same size as the driving wheels, whereby in the case of light vehicles only one supporting wheel is needed in the front part. Also in this case it is possible to use the afore mentioned running wheels which are positioned somewhat ahead of the supporting wheels and the axis of which is higher than the axes of both the supporting wheels and the driving wheels in order to accomplish the slanting part of the tracks in the front part of the vehicle.

2. Description of the Prior Art

In this type of supporting wheels, which are rigidly mounted on the vehicle and comprise either several small or one single bigger wheel, the wheels exert on the track construction a substantial, non-flexible resistance, against which the obstructions in the terrain, such as stones and tree stumps, hit rather hard irrespective of the upwardly deflecting front part of the tracks. In order to soften such an impact it is possible to provide the front supporting wheels with a spring system, but this solution has its own disadvantages as regards the operation of the tracks. When the driving power acts on the tracks also the supporting wheels will be pressed inwardly with a slackening of the tracks as a result, which fact, especially when turning the vehicle by operating the tracks in different directions, can lead to the tracks falling off the respective driving and running wheels.

DESCRIPTION OF THE INVENTION

By means of the invention the disadvantages resulting from the supporting wheels of the vehicle may be eliminated, it still being possible to achieve a sufficiently springy supporting wheel construction. This is achieved by combining the supporting wheels, preferably two in a row on either side of the vehicle, between themselves to a bogie, which is mounted on the vehicle in such a way that it can swing in a verticle plane through the longitudinal direction of the vehicle.

The invention also provides an endless track vehicle which is simple in design, rugged in construction and economical to manufacture.

The various features of nevelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is shown.

BRIEF DESCRIPTION OF THE DRAWING

The invention is described in more detail by means of the appended drawing in which FIG. 1 schematically shows the vehicle provided with endless tracks, viewed from one side.

DESCRIPTION OF THE PREFERRED EMBODIMENT

Figure 1:
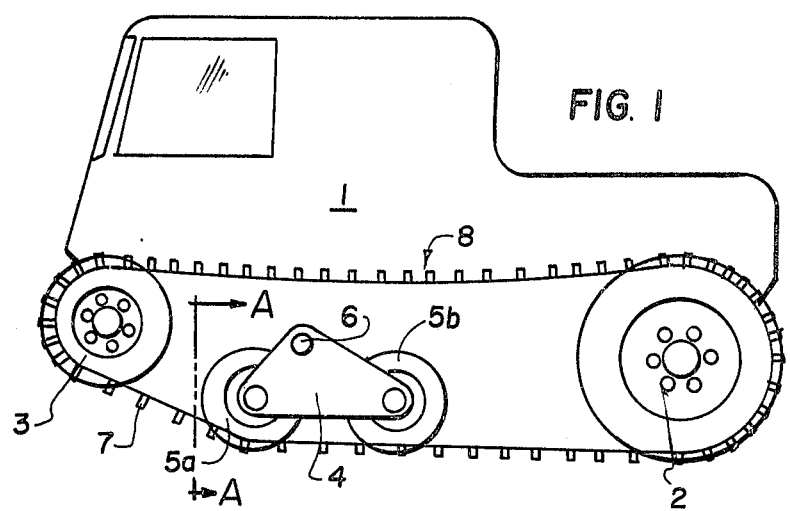

The vehicle body 1 shown in FIG. 1 receives its driving power for the tracks 8 from the driving wheels 2 situated in the rear of the vehicle, which wheels also support the rear part of the vehicle. In the front part of the vehicle is provided running wheels 3, over which the tracks 8 run. In order to support the front part the vehicle there is provided supporting wheels 5a, 5b which according to the invention are combined with and mounted to a bogie 4. The bogie is mounted to the vehicle 1 on the axle 6 so that it can swing in the longitudinal direction of the vehicle, the axle 6 being situated in a vertical plane about and near the middle between the axes of the supporting wheels 5a, 5b. When the vehicle moves forward in the terrain and the front supporting wheel 5a hits an obstacle on the ground, the wheel yields when the bogie swings around the axle 6. Hereby the second wheel 5b is pressed downwards to a corresponding degree, thereby compensating for the slacking of the track caused by the inward swinging of the front wheel. When the vehicle moves forward the obstacle then hits the rear wheel 5b whereby the bogie swings in the opposite direction.

FIG. 1 shows clearly an additional characterizing feature of the invention, that is the fact that the pivot axle 6 of the bogie 4, viewed in the direction of travel, is situated somewhat in front of the centre point between the axes of the wheels 5a, 5b. Hereby the rear wheel 5b in the bogie will have a longer torsion arm as compared to the front wheel 5a, and under an even load the rear wheel 5b thus attempts to swing the bogie 4 around the axle 6 so as to force the front wheel 5a outwardly, the front wheel thus effectively tightening the track in its front part, which normally is the first to touch the ground. Thus very small possibilities exist for the track to slide off the wheel 5a under these circumstances. A bogie secured to the vehicle in this manner follows the vehicle very well when this moves in the terrain without any lateral sliding whatsoever.

Figure 2:
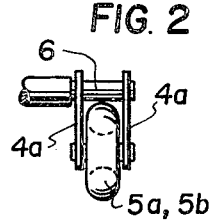

FIG. 2 shows the bogie in more detail, viewed along the line A—A in FIG. 1. As a pivoting and securing means for the bogie is provided the pin or axle 6, which can extend through the whole vehicle and be secured to its bottom. The bogie wheels or supporting wheels 5a, 5b can from their axles be secured to the shields 4a provided at the bogie frame. the securing means or pivot axle 6 of the bogie is preferably situated above the horisontal line connecting the supporting wheels 5a and 5b whereby the axle 6 extending through the vehicle does not reduce the distance from the vehicle to the ground.

Especially in cross-country vehicles of light construction it is possible to use pneumatic rubber wheels for both the wheels 2,3 and 5a, 5b, thus making the vehicle run relatively soundlessly and smoothly also on a hard surface.

Figure 3:
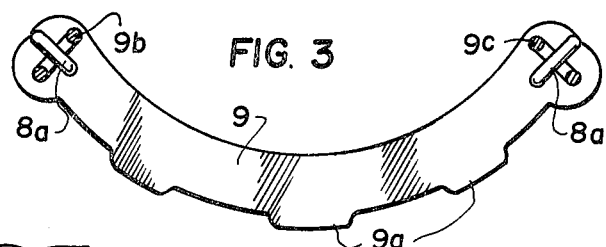
FIG. 2 is a detail of the bogie and FIGS. 3 and 4 show details of the track.
Figure 4:
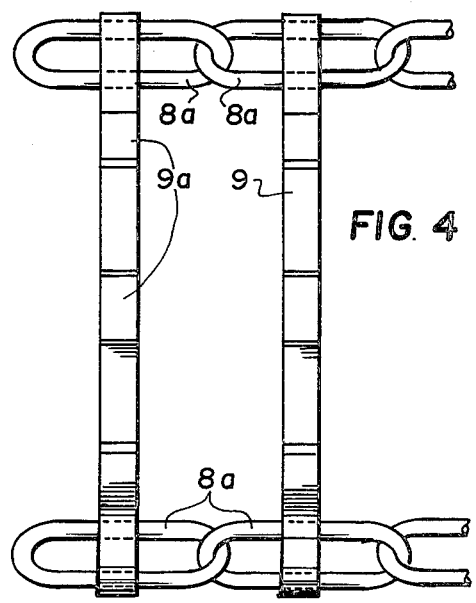

FIGS. 3 and 4 in the appended drawing show a suitable construction of the tracks.

In vehicles of this type which are often provided with rubber wheels, the track consists of two chains 8, which run parallel thereby forming simultaneously the edges of the track and its frame. The chains are interconnected by means of transverse blocks 9 which, especially in the case of vehicles povided with rubber wheels, are curved outwardly and thus exhibit a more suitable form for the concave wheel. The outer surface of the blocks can also be provided with bosses or protrusions 9a which increase the friction.

In prior known tracks the edge chains 8 are secured to the cross blocks 9 in such a manner that when the chain track is mounted on the wheels the planes of consecutive links are in turn at a right angle to the wheel axis and in turn parallel thereto. Thereby the edge chains at the connecting points of the links bend easily in the vertical plane along the driving and running wheels. A disadvantage of this construction is however the equally good bending capability of the edge chains also in the horisontal plane at the connecting points of the chain links. This is naturally an especially serious disadvantage in vehicles where the vehicle is steered by using different speeds for the tracks or even different driving directions for the tracks. In this case the known track constructions cannot resist the lateral forces that result when the vehicle turns, but the chains might bend and be displaced laterally and possibly fall off the wheels. However, according to the invention the lateral rigidity of the track can be greatly improved without impairing its bending capacity in the vertical plane.

This is achieved according to the invention by securing the side chains 8 to the crossing blocks 9 so that when the track chains are mounted on the wheels, the link plane of the chains from an angle of about 45 degrees with the wheel axes. When the chains 8 thus are turned around a wheel, the chain link joints become locked against bending in a direction perpendicular to the turning plane, i.e. in the direction of the wheel axis. The chains 8 form in this way in the horisontal direction rod-like rigid bodies which prevent the horisontal bending of the track chains and thus also their release from the wheels of the track system.

The crossing blocks are preferably bent and adapted to the concave thread surface of the wheels, as shown in FIG. 3. They are preferably provided with bosses or protrusions 9a in order to increase the friction. In order to secure the chains to the block ends the latter can be designed so that the links 8 fit into recesses 9b or 9c, respectively, in the block 9. In the example shown one block between each pair of links is provided ad the links form an angle of 45 degrees with the horisontal or vertical plane, but are turned in different directions. When the links have been fitted into the different recesses 9b and 9c, they are secured by welding. It is also possible to secure the blocks 9 to every other link and in this case the block ends can be of the same shape. Essential as regards the invention in any case is the position of the link plane in respect to the wheel axes. The chains are thus bendable in the plane perpendicular to the wheel axes but locked when turned around a wheel against displacement in the direction of the wheel axes. While a specific embodiment of the invention has been shown and described in detail to illustrate the application, of the principles of the invention, it will be understood that the invention may be embodied otherwise without departing from such principles.

What I claim is:

1. An endless track vehicle comprising, a vehicle body, a pair of driving wheels rotatably mounted near a rear end of the body supporting the rear end of the body, a pair of running wheels rotatably mounted and near an opposite front end of the body having a diameter smaller than that of the driving wheels and mounted at the location on the body so that the driving wheels extend lower than the running wheels, a pair of bogies pivotally mounted to the body between the driving and running wheels, two supporting wheels rotatably mounted to each of the bogies for supporting the front end of the body, a pair of tracks, each wrapped around a drive wheel, the supporting wheels of one bogie and a running wheel, each of said tracks comprising two spaced apart chains extending in a longitudinal direction of the body forming edges of each of said tracks, a plurality of transverse blocks connected between each of said two chains, each of said chains comprising a plurality of links with the transverse blocks connected between adjacent links with each of said links in a plane extending at about 45° to a plane containing an axis of rotation of said driving wheels.

2. An endless track vehicle according to claim 1, wherein each of said bogies comprises a pair of shields for rotatably mounting said supporting wheels therebetween, said bogies being pivotally mounted to said body at a location above and forward of a mid-point between the mounting of said two supporting wheels.

3. An endless track vehicle according to claim 1, wherein said driving, said running and said supporting wheels are all pneumatic tires.

4. An endless track vehicle according to claim 1, wherein each of said transverse blocks includes a plurality of friction bosses extending outwardly therefrom.

5. An endless track vehicle according to claim 4, wherein each of said transverse blocks is concaved outwardly to extend around a portion of a periphery of said driving wheels, said running wheels and said supporting wheels.

6. An endless track vehicle according to claim 1, wherein said transverse blocks are connected to each of said links of the chains.

7. An endless track vehicle according to claim 1, wherein said transvers blocks are connected to every other link of said chains.

* * * * *